United States Patent
Mäkelä et al.

(10) Patent No.: US 8,654,735 B2
(45) Date of Patent: Feb. 18, 2014

(54) IP MOBILITY MULTIHOMING

(75) Inventors: Tero Markku Mäkelä, Helsinki (FI); Fabien Rapin, Vantaa (FI); Ville Samuel Öhman, Espoo (FI)

(73) Assignee: Nokia Corporation, Espoo (FI)

( * ) Notice: Subject to any disclaimer, the term of this patent is extended or adjusted under 35 U.S.C. 154(b) by 1202 days.

(21) Appl. No.: 12/071,378

(22) Filed: Feb. 20, 2008

(65) Prior Publication Data
US 2009/0207806 A1    Aug. 20, 2009

(51) Int. Cl.
*H04W 40/36*  (2009.01)

(52) U.S. Cl.
USPC ............... 370/331; 455/432.1; 455/433

(58) Field of Classification Search
USPC ........................................... 370/331
See application file for complete search history.

(56) References Cited

U.S. PATENT DOCUMENTS

| | | | |
|---|---|---|---|
| 6,870,822 B2 | 3/2005 | Balogh | 370/332 |
| 6,931,109 B1 | 8/2005 | Cook | 379/114.02 |
| 6,965,948 B1 | 11/2005 | Eneborg et al. | 709/250 |
| 7,020,439 B2 | 3/2006 | Sinivaara et al. | 455/41.2 |
| 7,161,914 B2 | 1/2007 | Shoaib et al. | 370/331 |
| 7,430,604 B2* | 9/2008 | Balogh | 709/229 |
| 7,436,843 B2 | 10/2008 | Gustafsson et al. | 370/401 |
| 7,450,942 B2 | 11/2008 | Cho et al. | 455/435.2 |
| 2002/0002621 A1 | 1/2002 | Zhang et al. | 709/238 |
| 2003/0100308 A1 | 5/2003 | Rusch | 455/445 |
| 2004/0028009 A1 | 2/2004 | Dorenbosch et al. | 370/329 |
| 2004/0037260 A1* | 2/2004 | Kakemizu et al. | 370/338 |
| 2006/0031534 A1* | 2/2006 | Ishiyama et al. | 709/227 |
| 2007/0064649 A1 | 3/2007 | Makela et al. | |
| 2007/0211638 A1* | 9/2007 | Lee et al. | 370/238 |
| 2008/0175201 A1* | 7/2008 | Ahmavaara et al. | 370/331 |

FOREIGN PATENT DOCUMENTS

| | | |
|---|---|---|
| WO | WO 2004/031488 A1 | 4/2004 |
| WO | WO 2005/060209 A1 | 6/2005 |

OTHER PUBLICATIONS

P. Eronen, Ed. Nokia Jun. 2006; Network Working Group; IKEv2 Mobility and Multihoming Protocol (MOBIKE), RFC 4555.
D. Johnson Rice University, C. Perkins Nokia Research Center, J. Arkko Ericsson Jun. 2004; Network Working Group; Mobility Support In IPv6; RFC 3775.
C. Perkins, Ed. Nokia Research Center, Aug. 2002; Network Working Group; IP Mobility Support for IPv4; RFC 3344.
Montavont et al., Analysis of Multihoming in Mobile IPv6 draft-ietf-monami6-mipv6-analysis-04, Nov. 19, 2007, a total of 36 pages.
S. Deering et al., "IPv6 Scoped Address Architecture" draft-ietf-ipv6-scoping-arch-02.txt, Aug. 20, 2004.

\* cited by examiner

*Primary Examiner* — Dang T Ton
*Assistant Examiner* — Robert M Morlan
(74) *Attorney, Agent, or Firm* — Harrington & Smith

(57) ABSTRACT

The present application relates to a method for arranging IP mobility multihoming. A plurality of IP mobility configuration parameter sets is accessed, each of the sets being associated with a destination network. One of the IP mobility configuration parameter sets is selected for an IP data connection, the selected IP mobility configuration parameter set being associated with a destination network of the IP data connection. An IP mobility protocol instance associated with the destination network is activated on the basis of the selected IP mobility configuration parameter set.

22 Claims, 2 Drawing Sheets

IP MOBILITY MULTIHOMING

FIELD

The invention relates to IP mobility, and in particular to arranging IP mobility multihoming.

BACKGROUND

Internet Protocols (IP) are the backbone of modern networking and supported in most of the current telecommunications devices. IP is adaptable and has been extended to provide additional functionality.

Nowadays terminal devices are highly mobile and can change their point of attachment to the Internet at any time, even during active network connections. Mobile IP protocols, defined for IP version 6 (IPv6) in IETF specification RFC3775 and for IP version 4 (IPv4) in RFC 3344, allow mobile nodes to change their access point to the Internet without changing their IP address. Mobile IP defines a system for routing data of a mobile node to the current location of the node. This is accomplished through the use of a Home Agent that monitors the permanent IP address and current location of the mobile node. The Home Agent allows the mobile node to have a permanent address that is translated by the Home Agent into the mobile node's current address.

The Mobile IP standards assume that the host device has only one so called home network through which the device is always logically reachable regardless of where it physically happens to be at any given time. A problem with the mobile device arises should it have more than one home network, when those networks should be reached simultaneously. In such a situation, mobile nodes would be allocated multiple addresses and would be multihomed. The Mobile IP standards as such cannot cope with this kind of situation.

BRIEF DESCRIPTION

A method, apparatuses, and a computer program product are now provided, which are characterized by what is stated in the independent claims. Some embodiments of the invention are described in the dependent claims.

According to an aspect of the invention, a plurality of IP mobility configuration parameter sets is accessed, each of the sets being associated with a destination network. One of the IP mobility configuration parameter sets is selected for an IP data connection, the selected IP mobility configuration parameter set being associated with a destination network of the IP data connection. An IP mobility protocol instance associated with the destination network is activated on the basis of the selected IP mobility configuration parameter set.

The invention and various embodiments of the invention provide several advantages, which will become apparent from the detailed description below. One advantage is that, amongst a plurality of IP mobility configuration parameter sets, one associated with the same destination network as the data connection being established may be selected. Further, it is possible to have a plurality of IP mobility protocol instances active simultaneously, each associated with a specific destination network.

LIST OF DRAWINGS

Embodiments of the present invention are described below, by way of example only, with reference to the accompanying drawings, in which FIG. 1 illustrates a communications system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
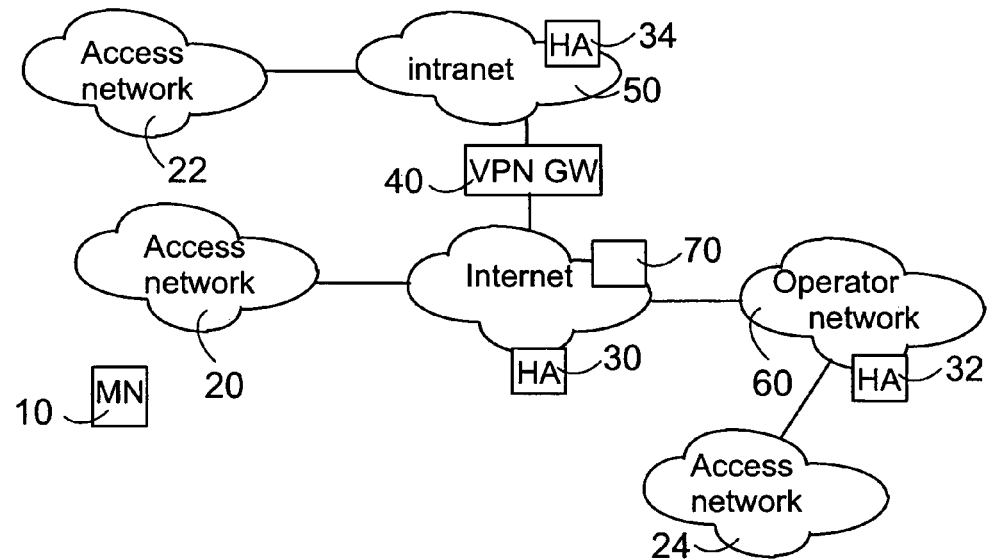

An embodiment of the invention will be illustrated in the following with reference to the communications system in FIG. 1. However, the application of the invention is not limited to any particular network configuration but embodiments of the invention can be applied to any communication system where a mobile node may be multihomed. A mobile node may be multihomed when it has either multiple addresses which are used as source addresses or multiple tunnels to transmit packets, or both.

A mobile node (MN) 10 may connect to various network resources via one or more access networks 20, 22, 24. For instance, the access network 20 could be a (wireless) local access network connected to the Internet and an Internet access gateway. Another example is a private access network 22, such as a wireless company LAN connected to a company intranet 50. A further example is a public access network 24, in one embodiment a cellular radio access network of a Public Land Mobile Network PLMN operator. For instance, the access network 24 may be a GSM/GPRS radio access network or a radio access network standardized by the Third Generation Partnership Project (3GPP) or connectable to a core network standardized by the 3GPP, which may also be referred to as a 3GPP access network or UMTS Radio Access Network (UTRAN) based on Wideband Code Division Multiple Access (WCDMA). The operator network 60 may thus be a GSM/GPRS core network or a core network standardized by the 3GPP, which may also be referred to as a 3GPP core network or UMTS core network, connected to the Internet. The MN 10 may be connected to one or more access networks 20, 22, 24 simultaneously and is capable of establishing connections to various resources of destination networks, such as a resource of the intranet 50, an Internet resource 70, or a resource of an operator network 60, even simultaneously.

The system comprises home agents (HA) 30, 32, 34 to hide the mobility of the MN 10 by transmitting packets to the home address of the MN to current care-of address of the MN obtained from the currently visited access network 20, 22, 24. In case of mobile IP version 4 (IPv4) a foreign agent would be provided in an access network or co-located in a terminal hosting the MN, but in mobile IP version 6 (MIPv6) no specific foreign agents are provided in access networks. A virtual private network (VPN) connection between the MN 10 and a VPN gateway 40 may be required for the MN 10 to connect the intranet 50 via an insecure network.

As can be seen, the MN 10 may have more than one home network. In some cases communications may be needed for the MN 10 via a plurality of home networks (and home agents 30, 32, 34) simultaneously, i.e. the mobile node may have a number of connections active simultaneously. For instance, one connection may be established to company intranet pages and another connection may be open to read e-mails from a private e-mail service by the internet operator, where these networks host an IP mobility service.

An improved IP mobility arrangement has now been developed in which a specific mobile IP protocol instance is established for and associated with a so-called destination network. A destination network may be represented by a destination network identifier identifying the destination IP network whose service the mobile node 10 is using or desires to use. The destination network may refer to a home network 50, 60 of the MN 10 including a home agent 32, 34 for the MN. The destination network may also refer to some other network for which an IP data connection is to be established, for instance generally the Internet. The present IP mobility arrangement is configured such that each mobile IP instance is valid only within the scope of one destination network. This enables running multiple mobile IP instances simultaneously. The mobile IP protocol instance is to be understood broadly to refer to any protocol instance or entity for IP communications facilitating mobility of a mobile node.

Figure 2:
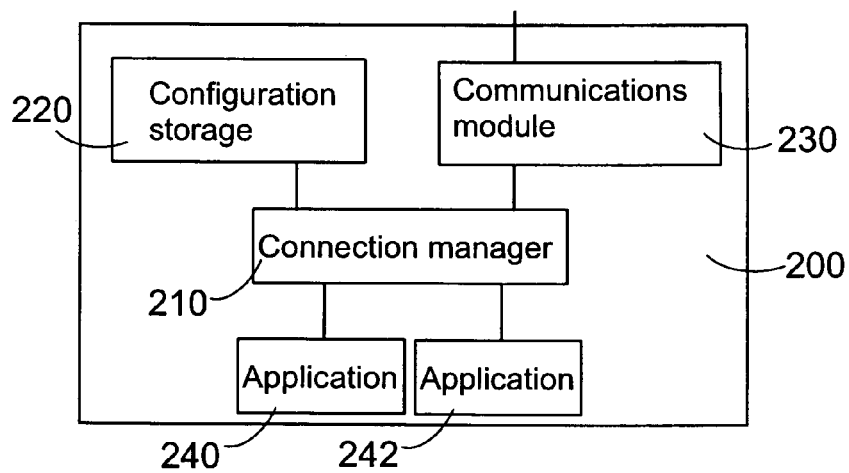
FIG. 2 illustrates an apparatus according to an embodiment.

FIG. 2 illustrates a simplified block diagram of an apparatus 200 according to an embodiment. The apparatus 200 comprises a connection manager or controller 210, applications 240, 242, one or more communications modules 230 and configuration storage 220. The connection manager 210 manages establishment of IP data connections established on the basis of a request from an application 240, 242. The connection manager 210 retrieves IP mobility configuration information from a configuration storage or database 220 and instructs a communications unit 230 to establish appropriate data connection utilizing a lower-layer protocols, as appropriate for the presently visited access network 20, 22, 24 to a desired destination network.

A plurality of IP mobility configuration parameter sets, each of the sets comprising a parameter for indicating a destination network, is stored in the storage 220 and retrieved by the manager 210. The manager 210 selects, for an IP data connection, one of the IP mobility configuration parameter sets amongst IP mobility configuration parameter sets associated with a destination network of the IP data connection. The manager 210 activates an IP mobility protocol instance on the basis of the selected IP mobility configuration parameter set. It is to be noted that the manager 210 could be a specific IP mobility controller only controlling IP mobility features.

Some further embodiments of features for the apparatus 200, and in particular for the connection manager 210, are illustrated below in connection with FIGS. 3 and 4. It should be appreciated that the apparatus may comprise other units. However, they are irrelevant to the present embodiments and, therefore, they need not to be discussed in more detail here.

The apparatus 200 may be any communications device capable of supporting IP address multihoming, such as the MN 10 roaming between and connected to a plurality of access networks 20, 22, 24. Examples of a communications device include a personal computer, an entertainment device such as a game console, a laptop, or a personal digital assistant with IP networking capability, an embedded computing device or a mobile station (mobile phone). In case of a mobile communications device comprising typically a plurality of transceivers for wireless communications, a wireless connection may be implemented with a wireless transceiver operating according to the GSM (Global System for Mobile Communications), WCDMA (Wideband Code Division Multiple Access), a network operating on non-licensed frequencies, such as WLAN (Wireless Local Area Network) or WiMAX, or any other suitable standard/non-standard wireless communication means.

Although the apparatus 200 has been depicted as one entity, different modules and memory may be implemented in one or more physical or logical entities. Although the modules are functionally separated in FIG. 2, at least some of these functions could be implemented in a single unit or module. Further, there could be an apparatus implementing only one of these units.

The apparatus could be in a form of a chip unit or some other kind of hardware module for controlling a data processing device. Such hardware module comprises connecting means for connecting the data processing device mechanically and/or functionally. Thus, the hardware module may form part of the device and could be removable. Some examples of such hardware module are a sub-assembly or an accessory device. For instance, all or some of the modules in FIG. 2, such as the connection manager 210, could be a single physical entity operationally connectable to other modules of FIG. 2. For instance, such apparatus may be a chipset or an integrated circuit suitable for use in a mobile station or a portable computer.

The apparatus comprises not only prior art means, but also means for arranging destination network-specific IP mobility protocol instances. In particular, means may be provided for arranging at least some of the features illustrated in connection with FIGS. 3 and 4.

The apparatus may be implemented as an electronic digital computer, which may comprise memory, a central processing unit (CPU), and a system clock. The CPU may comprise a set of registers, an arithmetic logic unit, and a control unit. The control unit is controlled by a sequence of program instructions transferred to the CPU from the memory. The program instructions may be coded by a programming language, which may be a high-level programming language, such as C, Java, etc., or a low-level programming language, such as a machine language, or an assembler.

An embodiment provides a computer program embodied on a distribution medium, comprising program instructions which, when loaded into an electronic apparatus, constitute one or more of the modules in FIG. 2. Such computer program may include program code for controlling the apparatus to perform the functions illustrated below in connection with FIGS. 3 and 4. The computer program may be in source code form, object code form, or in some intermediate form, and it may be stored in some carrier, which may be any entity or device capable of carrying the program. Such carriers include a record medium, computer memory, read-only memory, electrical carrier signal, telecommunications signal, and software distribution package, for example. In one further embodiment the present IP mobility control features are implemented by operating system software, such as the Symbian operating system for mobile devices, or as part of communications software implementing Mobile IP protocol.

The apparatus or the module 200 may also be implemented as one or more integrated circuits, such as application-specific integrated circuits ASIC. Other hardware embodiments are also feasible, such as a circuit built of separate logic components. A hybrid of these different implementations is also feasible.

Figure 3:
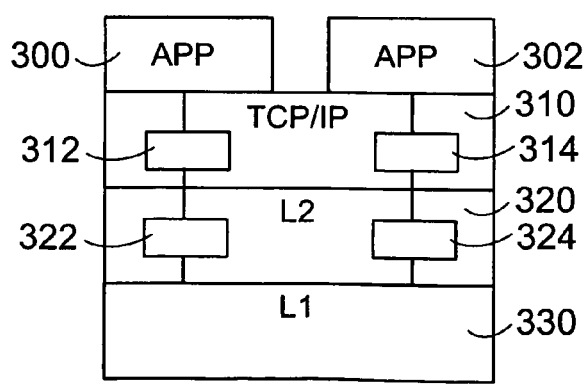
FIG. 3 illustrates a protocol stack according to an embodiment.

FIG. 3 illustrates a protocol stack according to an embodiment. This embodiment may be applied in the MN 10 and the apparatus 200 illustrated above. A TCP/IP (Transport Control Protocol/Internet Protocol) layer implementation 310 may provide applications 300, 302 with multiple simultaneous TCP/IP connections with mobility support. The layer 310 may provide UDP/IP (User Datagram Protocol/Internet Protocol) connections or other transport protocols over IP, instead of or in addition to TCP/IP connections. A first IP mobility protocol instance 312 is assigned for a first IP data connection to a destination network of the first data connection, on the basis of an IP mobility configuration parameter set including an identifier of a first destination network of the first IP data connection. Thus, routing configuration associated with the first destination network is established within the mobile device 10, 200.

If another application 302 activates another connection to another destination network with Mobile IP support, then either another instance of Mobile IP protocol implementation is started or a single Mobile IP implementation can handle multiple protocol instances by running them as separate entities, either way using a destination network as an identifier. A second IP mobility protocol instance 314 is assigned for a second IP data connection on the basis of an IP mobility configuration parameter set including an identifier of a second destination network (of the second IP data connection). These Mobile IP instances 312, 314 may be associated to different home agents, i.e. set up mobility bindings to different home networks. The instances 312, 314 are in one embodiment Mobile IPv4 or v6 instances. However, the present features are not limited to these protocols, but may be applied for any present or future protocol facilitating IP mobility, such as IKEv2/Mobike.

The IP data connections associated with different mobility protocol instances 312, 314 may be considered as separate layer 3 data flows. As illustrated in the embodiment of FIG. 3, separate layer 2 (L2) 320 (logical) connection entities or interfaces 322, 324 may serve these IP data flows. For instance, the MN 10 may be connected to WLAN access network 22 and a UTRAN 24. A WLAN L2 interface is used for L2 services for the IP mobility protocol instance 312 associated with the intranet 50, whereas a 3GPP-standard protocol interface is used for data delivery for the second IP mobility protocol instance 314 associated with the PLMN operator network 60. By the arrangement illustrated in FIG. 3, changes in lower layer access service affecting first IP mobility protocol instance 312, such as roaming to another access network, do not affect the operation of the second IP mobility protocol instance 314 served by the other L2 entity 324 connected to another access network. However, it is to be noted that also a single L2 reference point may be used to serve the IP mobility protocol instances.

For instance, the first protocol instance 312 may set up a mobility binding with the company intranet 50 home agent 34 for company intranet access purposes, whereas the second protocol instance 314 is establishes mobility binding with the home agent 32 in the PLMN operator's network 60. For instance, the user may wish to browse the company intranet 50 pages and also have a connection read some personal emails from a server in the Internet. The company intranet 50 may provide mobility services so that the user may switch seamlessly between the company's access network connection and a dedicated dial-up connection while continuing to surf the intranet. In this example the first IP mobility protocol instance 312 may update binding by submitting a new care of address, obtained from the cellular network 24, 60, to the home agent 34 in response to the MN 10 leaving coverage area of the WLAN access network 22 (and being connected to the cellular radio access network 24).

Another example is that in the Internet there can be a public Mobile IP service 30, which enables seamless handover from e.g. a GPRS connection to a public WLAN hotspot. With the present arrangement, both applications 240, 242 could utilize automatically the best available data bearer and roam seamlessly when another one becomes available or disappears.

Figure 4:
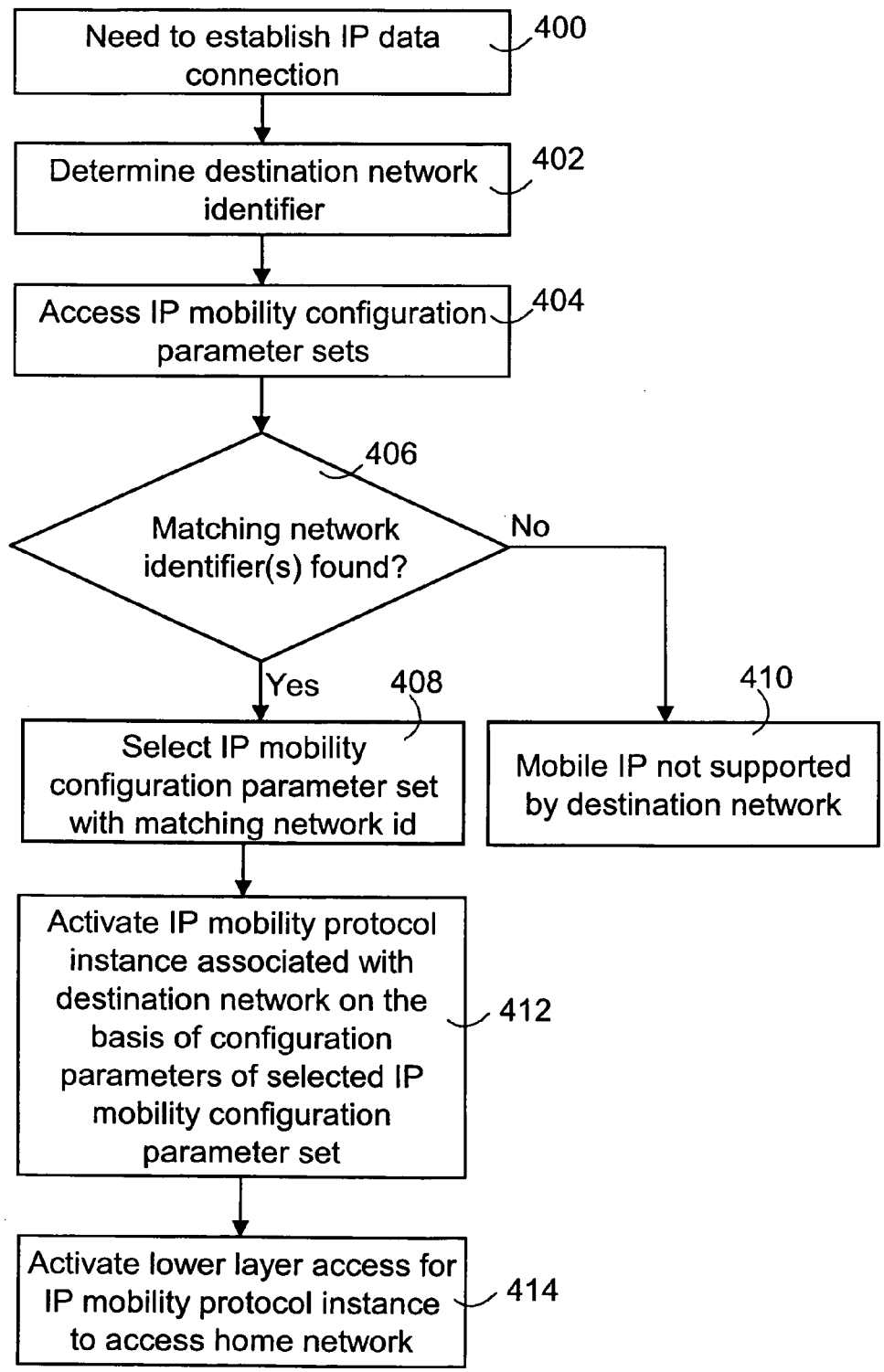
FIG. 4 illustrates a method according to an embodiment.

FIG. 4 illustrates a method according to an embodiment. This method may be implemented in the MN 10 or the apparatus 200, in a further embodiment by the connection manager 210. In step 400 there is a need to establish an IP data connection, based on a request from an application or a user. In step 402 an identifier of the desired destination network is determined. This destination network ID may be determined on the basis of the indication from an application or the user.

In step 404 the IP mobility configuration parameter sets are accessed. In particular, the destination network identifiers stored as part of the parameter sets are reviewed and compared to the present destination network identifier determined in step 402. If in step 406 one or more matching network identifiers are found, in step 408 an IP mobility configuration parameter set with matching network ID is selected.

If there is more than one candidate parameter set with matching network ID, an algorithm may be executed in step 408 to select the most favorable access method/network to provide access at least partly to the destination network. The most appropriate IP mobility configuration is determined for the IP data connection amongst the plurality of IP mobility configuration parameter sets with matching destination network identifier on the basis of one or more selection criterion. An IP mobility configuration parameter set determined as the most appropriate IP mobility configuration is selected for the IP data connection.

If no matching network identifier was found in step 406, the destination network does not support or use Mobile IP 410. Hence, the Mobile IP related procedure of FIG. 4 may end and the IP data connection establishment procedure may continue without use of Mobile IP.

In step 412 an IP mobility protocol instance associated with the destination network is activated on the basis of configuration parameters of the selected IP mobility configuration parameter set. In step 414 lower layer access, in accordance with the underlying lower layer (L2/L1) 320, 330 infrastructure, is activated for the IP mobility protocol instance for enabling access to the Mobile IP home network.

In one embodiment, a Mobile IPv4 or v6 protocol instance, specific to the destination network, is activated in step 412. Procedures for establishing a mobility binding are then started in accordance with the MIP4 or MIPv6 protocol and a care of address is acquired for the MN 10. A Mobile IP registration request (MIPv4) or binding update (MIPv6) is transmitted to a home agent indicated in the selected IP mobility configuration parameter set.

After establishing the IP mobility protocol instance associated with the destination network, IP packets to/from this destination network and associated with the care-of-address belong to the IP data flow controlled by the destination network specific mobility protocol instance.

In one embodiment, each IP mobility protocol instance 312, 314 operates its own Mobile IP session independently of other instances. Each IP mobility protocol instance may thus carry out Mobile IPv4 or v6 operations after steps 412 and 414 as required. For instance, Mobile IPv4 or v6 mobility binding updates are carried out with the home agent in accordance with changes in lower layer access service for the IP mobility protocol instance. Since these instances are independent of each other in the present Mobile IP implementation, changes related to one mobility instance do not affect the other. Hence, the mobile node 10 may roam between different access networks 20, 22, 24 and remove mobility binding to a first destination network without any effect to the mobility binding to a second destination network and the operation of the second IP mobility protocol instance.

The destination network identifier may be included as an additional parameter in existing mobile IP configuration parameter sets. In addition to home address and destination network ID, further configuration information for Mobile IP mobility are stored in the parameter sets. For instance, the Mobile IP parameter sets may include the following MIPv6 parameters:_HomeAddress, HomeAgentAddress, PrefixLength, EnableRouteOptimization, EnableIPSec, MNHMuthAlgorithm, MNHAEncryptAlgorithm, MNHASPIIndicator, MNHASPI, MNHASSData. Further information related to these parameters is available in the Mobile IPv6 specification RFC3775.

Each destination network where Mobile IP is supported may be pre-configured with its own Mobile IP configuration parameters, such as address of home agent HA. In one embodiment, specific destination network specific profiles or collections of IP mobility configuration parameters are stored in the storage 220.

In one embodiment, each of the IP mobility configuration parameter sets, such as a table including above Mobile IPv6 parameters, is directly or indirectly linked with destination network information. An IP mobility configuration parameter set linked with the destination network of an IP data connection being established is selected for establishing the IP mobility protocol instance for the IP data connection. In one embodiment a mapping table is used to provide the association between destination network identifiers and mobile IP configuration sets.

In one embodiment, each access point or network configuration in the mobile device 10, 200 is associated with a destination network. Hence, the same destination network identifier included in an IP mobility configuration parameter set may be included in an access point configuration specifying a set of parameters for establishing an access network (20, 22, 24) connection. When an application initiates a data connection to a destination network, for instance network 50, 60 or the Internet, the most appropriate access point configuration is selected to establish a L2 entity 322, 324 to serve to serve the data connection.

Additionally, if IP mobility is enabled in the destination network, i.e. an IP mobility configuration parameter set with matching destination network is found, the Mobile IP protocol implementation may register with the HA in the home network 50, 60 of the selected configuration parameter set as already indicated. Hence, according to an embodiment, the destination network is detected 402 on the basis of a selected one of a plurality of access point parameter sets.

In one embodiment, when selecting an access network for a Mobile IP connection, i.e. activating (414) or modifying an L2 320 connection, only the access networks and access point configurations associated with that particular destination networks are included in selection procedure. Such procedure can be carried out in connection with initial Mobile IP connection establishment (414) or in response to mobility of the MN 10 to a new access network to provide service continuity of the Mobile IP based connection to the destination network for the active IP mobility protocol instance 312, 314 associated with this destination network. Hence, the access point or network selection procedure in a roaming situation or in step 414 may be based on the destination network identifier associated with the IP mobility protocol instance. The selection can be based on one or more mobility policies that determine the priority order of access networks within the destination network.

It is to be noted that the access point and IP mobility parameter sets do not need to be separate, but there may be access configuration parameter sets comprising both access network and IP mobility related parameters, each configuration being associated with a destination network. Hence, the presently used term "IP mobility configuration parameter set" may refer to such access configuration parameter set.

In one embodiment a destination network parameter is included in one or more VPN profiles stored in the configuration storage 220. The steps as illustrated in FIG. 4 may be applied also for selecting a VPN profile for a data connection and then establishing a destination network specific VPN protocol instance. Thus, in/after step 412 a VPN tunnel may be established to a VPN gateway indicated in the selected IP mobility configuration parameter set.

In addition to running multiple Mobile IP instances "side by side", it is also possible to stack the protocol instances so that they are run layered on top of each other. An expected use case is such that the mobile device 10 takes a connection to company intranet, where Mobile IP is used. If there is no direct connection to the intranet, a VPN tunnel is established over the Internet. In the Internet, some public Mobile IP service is used. Here the relevant protocol stack looks like:

Mobile IP (Service hosted by the company intranet)
VPN (over Internet)
Mobile IP (Service hosted by another provider in the Internet)

The topmost Mobile IP instance handles the mobility within the company intranet. VPN provides a secure connection to the company intranet over the public Internet. The lower Mobile IP instance provides mobility for the Internet connection that the VPN is using.

The above situation may be addressed by the present destination network specific protocol instances, as illustrated above, together with the ability to stack protocols on top of each other, which can be done by using so called virtual access points, for instance. Virtual access points are like conventional access points, but instead of providing a direct network connection they refer to another underlying access point or access point group (Destination Network) for providing the connection. It is to be noted that even without protocol stacking, Mobile IP and VPN instances may utilize virtual access points.

In one embodiment at least some of the above features are applied in Symbian operating system communication infrastructure. However, it is to be noted that the implementation of the present features is not limited to any particular operating system.

In Symbian communications architecture, applications use networking API classes in DLLs (Dynamic Link Library) to access communications features. As with other application-level DLLs, the communication DLLs hide the details of the underlying architecture. A socket server is a process that implements and manages communication sockets. Applications act as clients to this server through the application-level communication DLLs. Protocol modules are used for handling the network data protocols. One of such protocol modules is the TCP/IP module. A connection agent is a DLL that is responsible for starting and stopping the communication connection. A connection agent will consult a communication database to determine how to establish the network connection. This database contains all the settings applicable to communication connections. Once a connection is chosen, the agent will extract all the applicable connection parameters from the database to start the connection by using lower level services. A connection to a network on a Symbian smartphone is known as an Internet Access Point (IAP).

A parameter called Network ID in Symbian IAP settings is in one embodiment used for identifying the destination network for IP mobility purposes by utilizing at least part of the features illustrated above. The network ID may be used in routing decisions, and applications may use it when setting up network connections. For example, a GPRS IAP may be determined as one connection resource (IAP in the Symbian terminology) for providing access to the Internet, i.e. the Internet is the target network. The GPRS IAP comprises not only the network identifier, but also the PDP context type (IPv4/IPv6), GPRS access point name and applied TCP/IP settings, for instance. For instance, the destination network and the IAP information may be indirectly linked to a Mobile IP table including appropriate Mobile IP parameters.

The Symbian operating system, starting from version 7.0, provides the possibility of using multiple simultaneous IP data connections, each with its own unique IP address. Multiple simultaneous OSI layer 2 datalink interfaces may be provided to server these IP data connections. Multiple IAPs can be active, and applications can specify which ones they will use. With the present features, it is now possible to run also multiple Mobile IP instances, each linked to a specific destination network, in Symbian communications architecture. The multiple mobile IP instances may be modelled as multiple virtual IP connections.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
accessing, in response to a request to establish an Internet Protocol data connection, a plurality of previously stored Internet Protocol mobility configuration parameter sets, each of the plurality of Internet Protocol mobility configuration parameter sets being specific for only one of a plurality of destination networks,
selecting, for an Internet Protocol data connection, one of the Internet Protocol mobility configuration parameter sets, the selected Internet Protocol mobility configuration parameter set being specific for one destination network,
activating an Internet Protocol mobility protocol instance for the one destination network on the basis of the selected Internet Protocol mobility configuration parameter set; and
establishing the Internet Protocol data connection having a destination network that is the same as the one destination network for which the selected Internet Protocol mobility configuration parameter set is specific, wherein the Internet Protocol mobility protocol instance is valid only for the destination network so that another Internet Protocol mobility protocol instance can be activated simultaneously and independently with the Internet Protocol mobility protocol instance activated for the destination network.

2. The method of claim 1, wherein a mobile Internet Protocol registration request or binding update is transmitted to a home agent indicated in the selected Internet Protocol mobility configuration parameter set.

3. The method of claim 1, wherein a virtual private network VPN tunnel is established to a VPN gateway indicated in the selected Internet Protocol mobility configuration parameter set.

4. The method of claim 1, wherein each of the plurality of Internet Protocol mobility configuration parameter sets comprises a parameter for indicating the specific destination network whereby destination network identifiers of the Internet Protocol mobility configuration parameter sets are compared to an identifier of the specific destination network of the Internet Protocol data connection from an application initiating the establishment of the Internet Protocol data connection,
in response to there being a plurality of Internet Protocol mobility configuration parameter sets with a matching destination network identifier, the most appropriate Internet Protocol mobility configuration is determined for the Internet Protocol data connection, amongst the plurality of Internet Protocol mobility configuration parameter sets with matching destination network identifier, on the basis of one or more selection criterion, and
an Internet Protocol mobility configuration parameter set determined as the most appropriate Internet Protocol mobility configuration is selected for the Internet Protocol data connection.

5. The method of claim 1, wherein each of the Internet Protocol mobility configuration parameter sets is directly or indirectly linked with destination network information, and
the Internet Protocol mobility configuration parameter set linked with the specific destination network of the Internet Protocol data connection is selected for establishing the IP mobility protocol instance.

6. The method of claim 1, further comprising detecting the destination network on the basis of a selected one of a plurality of access connection parameter sets, each of the access connection parameter sets comprising an identifier for the specific destination network and the selected access connection parameter set including the identifier of the desired destination network.

7. The method of claim 1, wherein a first Internet Protocol mobility protocol instance is assigned for a first Internet Protocol data connection on the basis of an Internet Protocol mobility configuration parameter set including an identifier of a first destination network of the first Internet Protocol data connection, and
a second Internet Protocol mobility protocol instance is assigned for a second Internet Protocol data connection on the basis of an Internet Protocol mobility configuration parameter set including an identifier of a second destination network of the second Internet Protocol data connection.

8. An apparatus comprising:
a processor,
memory including computer program code,
the memory and the computer program code configured to, with the processor, cause the apparatus at least to perform:
access, in response to a request to establish an Internet Protocol data connection, a plurality of previously stored Internet Protocol mobility configuration parameter sets, each of the plurality of Internet Protocol mobility configuration parameter sets being specific for only one of a plurality of destination networks, activate, for an Internet Protocol data connection, an Internet Protocol mobility protocol instance on the basis of one of the plurality of Internet Protocol mobility configuration parameter sets, the one of the plurality of Internet Protocol mobility configuration parameter sets being specific for one destination network, and establish the Internet Protocol data connection having a destination network that is the same as the one destination network for which the one of the plurality of Internet Protocol mobility configuration parameter sets is specific, wherein the Internet Protocol mobility protocol instance is valid only for the destination network so that another Internet Protocol mobility protocol instance can be activated simultaneously and independently with the Internet Protocol mobility protocol instance activated for the destination network.

9. The apparatus of claim 8, wherein the Internet Protocol mobility protocol instance is configured to transmit a mobile Internet Protocol registration request or binding update to a home agent indicated in the selected Internet Protocol mobility configuration parameter set.

10. The apparatus of claim 8, wherein the apparatus is configured to establish a virtual private network VPN tunnel to a VPN gateway indicated in the selected Internet Protocol mobility configuration parameter set.

11. The apparatus of claim 8, wherein each of the plurality of Internet Protocol mobility configuration parameter sets comprises a parameter for indicating the specific destination network, where execution of the program instructions further causes the data processing unit to compare destination network identifiers of the Internet Protocol mobility configuration parameter sets to an identifier of the specific destination network of the Internet Protocol data connection from an application initiating the establishment of the Internet Protocol data connection, in response to there being a plurality of Internet Protocol mobility configuration parameter sets with matching destination network identifier, to determine the most appropriate Internet Protocol mobility configuration for the Internet Protocol data connection, amongst the plurality of Internet Protocol mobility configuration parameter sets with matching destination network identifier, on the basis of one or more selection criterion, and to select for the Internet Protocol data connection an Internet Protocol mobility configuration parameter set determined as the most appropriate Internet Protocol mobility configuration.

12. The apparatus of claim 8, wherein each of the Internet Protocol mobility configuration parameter sets is directly or indirectly linked with destination network information, and
where execution of the program instructions further causes the data processing unit to select the Internet Protocol mobility configuration parameter set linked with the destination network of the Internet Protocol data for establishing the Internet Protocol mobility protocol instance.

13. The apparatus of claim 8, wherein the apparatus is configured to detect the specific destination network on the basis of a selected one of a plurality of access connection parameter sets, each of the access connection parameter sets comprising an identifier for a destination network and the selected access connection parameter set including the identifier of the desired destination network.

14. The apparatus of claim 8, wherein the apparatus is configured to assign a first Internet Protocol mobility protocol instance for a first Internet Protocol data connection on the basis of an Internet Protocol mobility configuration parameter set including an identifier of a first destination network of the first Internet Protocol data connection, and
the apparatus is configured to assign a second Internet Protocol mobility protocol instance for a second Internet Protocol data connection on the basis of an Internet Protocol mobility configuration parameter set including an identifier of a second destination network of the second Internet Protocol data connection.

15. The apparatus of claim 8, wherein the apparatus is a mobile communications terminal device.

16. A non-transitory memory device that stores a computer program comprising program instructions that encode a computer process for Internet Protocol mobility control in a communications device, the computer process comprising:

accessing a plurality of previously stored Internet Protocol mobility configuration parameter sets, each of the plurality of Internet Protocol mobility configuration parameter sets being specific for only one of a plurality of destination networks, selecting, for an Internet Protocol data connection, one of the Internet Protocol mobility configuration parameter sets, the selected Internet Protocol mobility configuration parameter set being specific for one destination network, activating an Internet Protocol mobility protocol instance for the one destination network on the basis of the selected Internet Protocol mobility configuration parameter set; and establishing the Internet Protocol data connection having a destination network that is the same as the one destination network for which the selected Internet Protocol mobility configuration parameter set is specific, wherein the Internet Protocol mobility protocol instance is valid only for the destination network so that another Internet Protocol mobility protocol instance can be activated simultaneously and independently with the Internet Protocol mobility protocol instance activated for the destination network.

17. The non-transitory memory device of claim 16, wherein each of the Internet Protocol mobility configuration parameter sets is directly or indirectly linked with destination network information, the computer process further comprising selecting the Internet Protocol mobility configuration parameter set linked with the specific destination network of the Internet Protocol data connection for establishing the Internet Protocol mobility protocol instance.

18. An apparatus comprising:
a controller for accessing, in response to a request to establish an Internet Protocol data connection, a plurality of previously stored Internet Protocol mobility configuration parameter sets, each of the plurality of Internet Protocol mobility configuration parameter sets being specific for only one of a plurality of destination networks;
the controller also for selecting, for an Internet Protocol data connection, one of the Internet Protocol mobility configuration parameter sets, the selected Internet Protocol mobility configuration parameter set being specific for one destination network, and
the controller also for activating an Internet Protocol mobility protocol instance for the one destination network on the basis of the selected Internet Protocol mobility configuration parameter set; and
the controller also for instructing a communications unit to establish the Internet Protocol data connection having a destination network that is the same as the one destination network for which the selected Internet Protocol mobility configuration parameter set is specific, wherein the Internet Protocol mobility protocol instance is valid only for the destination network so that another Internet Protocol mobility protocol instance can be activated simultaneously and independently with the Internet Protocol mobility protocol instance activated for the destination network.

19. An apparatus of claim 18, wherein each of the Internet Protocol mobility configuration parameter sets is directly or indirectly linked with destination network information, wherein the controller also being for selecting the Internet Protocol mobility configuration parameter set linked with the specific destination network of the Internet Protocol data connection for establishing the Internet Protocol mobility protocol instance.

20. The method of claim 1, where accessing, selecting and activating is performed at least twice to cause a plurality of Internet Protocol mobility protocol instances to be simultaneously activated for a plurality of different destination networks.

21. A method according to claim 1, wherein another Internet Protocol mobility configuration parameter set is selected from the plurality of Internet Protocol mobility configuration parameter sets for another Internet Protocol data connection, said another Internet Protocol mobility configuration parameter set being specific for another destination network, and said another Internet Protocol mobility protocol instance is activated for said another destination network simultaneously and independently with the Internet Protocol mobility protocol instance activated for the destination network so that changes to the Internet Protocol mobility protocol instance does not affect the operation of said another Internet Protocol mobility protocol instance.

22. The apparatus according to claim 8, wherein another Internet Protocol mobility configuration parameter set is selected from the plurality of Internet Protocol mobility configuration parameter sets for another Internet Protocol data connection, said another Internet Protocol mobility configuration parameter set being specific for another destination network, and said another Internet Protocol mobility protocol instance is activated for said another destination network simultaneously and independently with the Internet Protocol mobility protocol instance activated for the destination network so that changes to the Internet Protocol mobility protocol instance does not affect the operation of said another Internet Protocol mobility protocol instance.

* * * * *